US009052804B1

(12) United States Patent
Starner et al.

(10) Patent No.: US 9,052,804 B1
(45) Date of Patent: Jun. 9, 2015

(54) OBJECT OCCLUSION TO INITIATE A VISUAL SEARCH

(75) Inventors: Thad Eugene Starner, Mountain View, CA (US); Irfan Essa, Atlanta, GA (US); Hayes Solos Raffle, Palo Alto, CA (US); Daniel Aminzade, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 190 days.

(21) Appl. No.: 13/417,508

(22) Filed: Mar. 12, 2012

Related U.S. Application Data

(60) Provisional application No. 61/583,968, filed on Jan. 6, 2012.

(51) Int. Cl.
*G09G 5/00* (2006.01)
*G06F 3/0484* (2013.01)
*G06F 3/01* (2006.01)
*G06F 3/00* (2006.01)
*G06F 1/16* (2006.01)

(52) U.S. Cl.
CPC ............ *G06F 3/04842* (2013.01); *G06F 3/017* (2013.01); *G06F 3/005* (2013.01); *G06F 1/163* (2013.01)

(58) Field of Classification Search
CPC ............ G06F 17/30864; G06F 9/4443; G06F 17/30991; G06F 3/017; G06F 3/0481; G06F 3/04815; G06F 2203/0402; G06F 3/04842; G06T 11/60; G06T 2207/10016; G06T 7/2013
USPC .................................................. 382/165, 199
See application file for complete search history.

(56) References Cited

U.S. PATENT DOCUMENTS

| 7,209,577 | B2 | 4/2007 | McAlpine et al. |
| 7,487,468 | B2* | 2/2009 | Tanaka et al. ................. 715/863 |
| 2002/0107847 | A1* | 8/2002 | Johnson ............................ 707/3 |
| 2002/0168091 | A1* | 11/2002 | Trajkovic ...................... 382/107 |
| 2003/0195883 | A1* | 10/2003 | Mojsilovic et al. ............... 707/6 |
| 2004/0070611 | A1* | 4/2004 | Tanaka et al. ................. 345/757 |
| 2005/0271279 | A1* | 12/2005 | Fujimura et al. ............. 382/203 |
| 2005/0280707 | A1* | 12/2005 | Sablak et al. ................. 348/155 |
| 2008/0005703 | A1* | 1/2008 | Radivojevic et al. ......... 715/863 |

(Continued)

FOREIGN PATENT DOCUMENTS

EP 2378488 10/2011

OTHER PUBLICATIONS

Oikonomidis et al., "Efficient Model-based 3D Tracking of Hand Articulations using Kinect," The 22nd British Machine Vision Conference (Aug. 2011).

(Continued)

*Primary Examiner* — Alexander Eisen
*Assistant Examiner* — Sanjiv D Patel
(74) *Attorney, Agent, or Firm* — McDonnell Boehnen Hulbert & Berghoff LLP

(57) ABSTRACT

Methods and devices for initiating a search of an object are disclosed. In one embodiment, a method is disclosed that includes receiving video data recorded by a camera on a wearable computing device, where the video data comprises at least a first frame and a second frame. The method further includes, based on the video data, detecting an area in the first frame that is at least partially bounded by a pointing device and, based on the video data, detecting in the second frame that the area is at least partially occluded by the pointing device. The method still further includes initiating a search on the area.

21 Claims, 12 Drawing Sheets

(56) References Cited

U.S. PATENT DOCUMENTS

| | | | |
|---|---|---|---|
| 2008/0019589 A1* | 1/2008 | Yoon et al. | 382/165 |
| 2008/0284864 A1 | 11/2008 | Kotake et al. | |
| 2009/0109795 A1* | 4/2009 | Marti | 367/118 |
| 2009/0157610 A1* | 6/2009 | Allen et al. | 707/3 |
| 2010/0125812 A1* | 5/2010 | Hartman et al. | 715/848 |
| 2010/0199232 A1* | 8/2010 | Mistry et al. | 715/863 |
| 2010/0260426 A1* | 10/2010 | Huang et al. | 382/218 |
| 2011/0140994 A1 | 6/2011 | Noma | |
| 2011/0213664 A1 | 9/2011 | Osterhout et al. | |
| 2012/0059787 A1 | 3/2012 | Brown et al. | |
| 2012/0139827 A1* | 6/2012 | Li et al. | 345/156 |
| 2012/0249422 A1* | 10/2012 | Tse et al. | 345/158 |
| 2012/0249590 A1 | 10/2012 | Maciocci et al. | |
| 2012/0294520 A1* | 11/2012 | Mei et al. | 382/164 |
| 2014/0013279 A1* | 1/2014 | Mongia et al. | 715/835 |

OTHER PUBLICATIONS

Wang et al., "Real-Time Hand-Tracking with a Color Glove," ACM Transactions on Graphics (Jul. 2009).

Lyons et al., "GART: The Gesture and Activity Recognition Toolkit," HCI (Jul. 2007).

de la Hamette et al., "Laser Triangulation as a means of robust Visual Input for Wearable Computers," International Symposium on Wearable Computers (Oct. 2004).

Athitsos et al., "Estimating 3D Hand Pose from a Cluttered Image," Proceedings of the IEEE Computer Society Conference on Computer Vision and Pattern Recognition (Jun. 2003).

Stenger et al., "Model-Based 3D Tracking of an Articulated Hand," Proceedings of the IEEE Computer Society Conference on Computer Vision and Pattern Recognition (Dec. 2001).

Freeman et al., "Orientation Histograms for Hand Gesture Recognition," Mitsubishi Electric Research Laboratories (Dec. 1994).

"Histogram of Oriented Gradients," Wikipedia, (Feb. 15, 2012), http://en.wikipedia.org/wiki/Histogram_of_oriented_gradients.

"Kids in the Hall the Head Crusher Crushes Businessmen's Heads," YouTube (Nov. 24, 2008), http://www.youtube.com/watch?v=1pKXMcfx1d8.

Meyer, Matthew, "ISnipeYou.", Augmented Reality Sniper for Android, Sense8, Feb. 11, 2012.

Peng Song, et al., 2008, "Vision-based 3D finger interactions for mixed reality games with physics simulation," In Proceedings of the 7th ACM SIGGRAPH International Conference on Virtual-Reality Continuum and Its Applications in Industry (VRCAI '08), ACM, New York, NY, USA., Article 7, 6 pages.

Wichert, R., 2002, "Collaborative gaming in a mobile augmented reality environment," In Proceedings of First Ibero-American Symposium in Computer Graphics (SIACG, 2002).

* cited by examiner

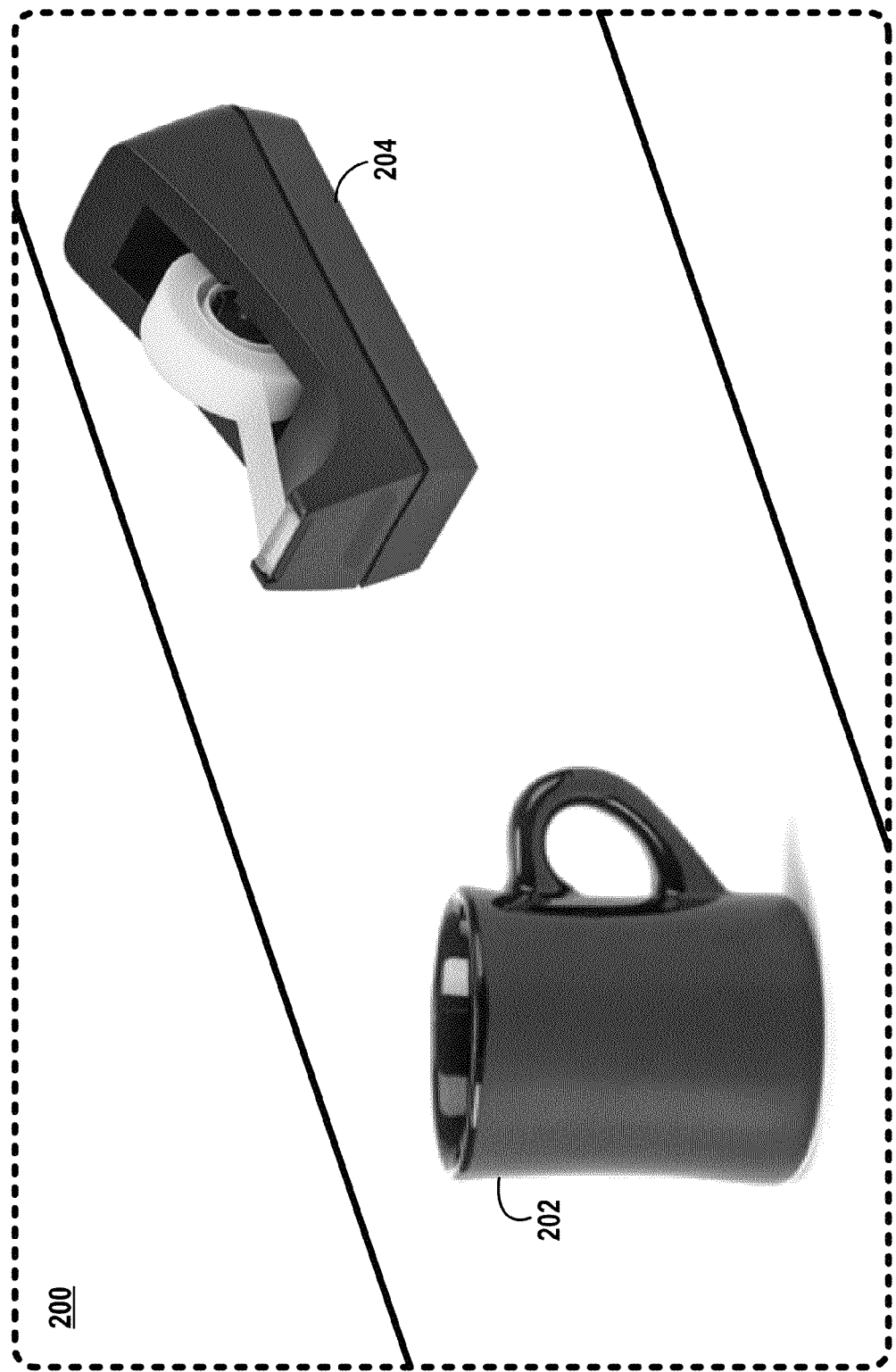

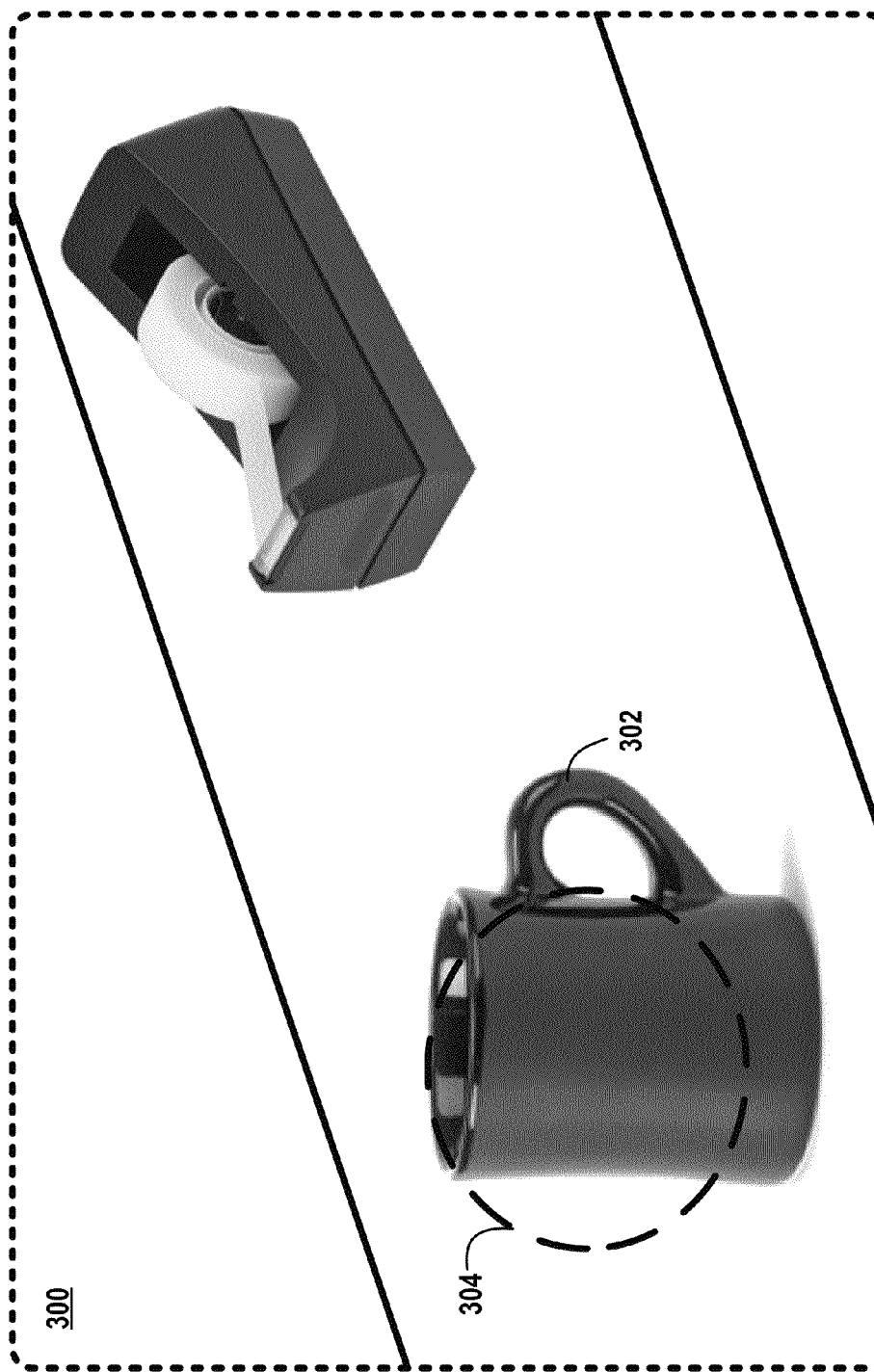

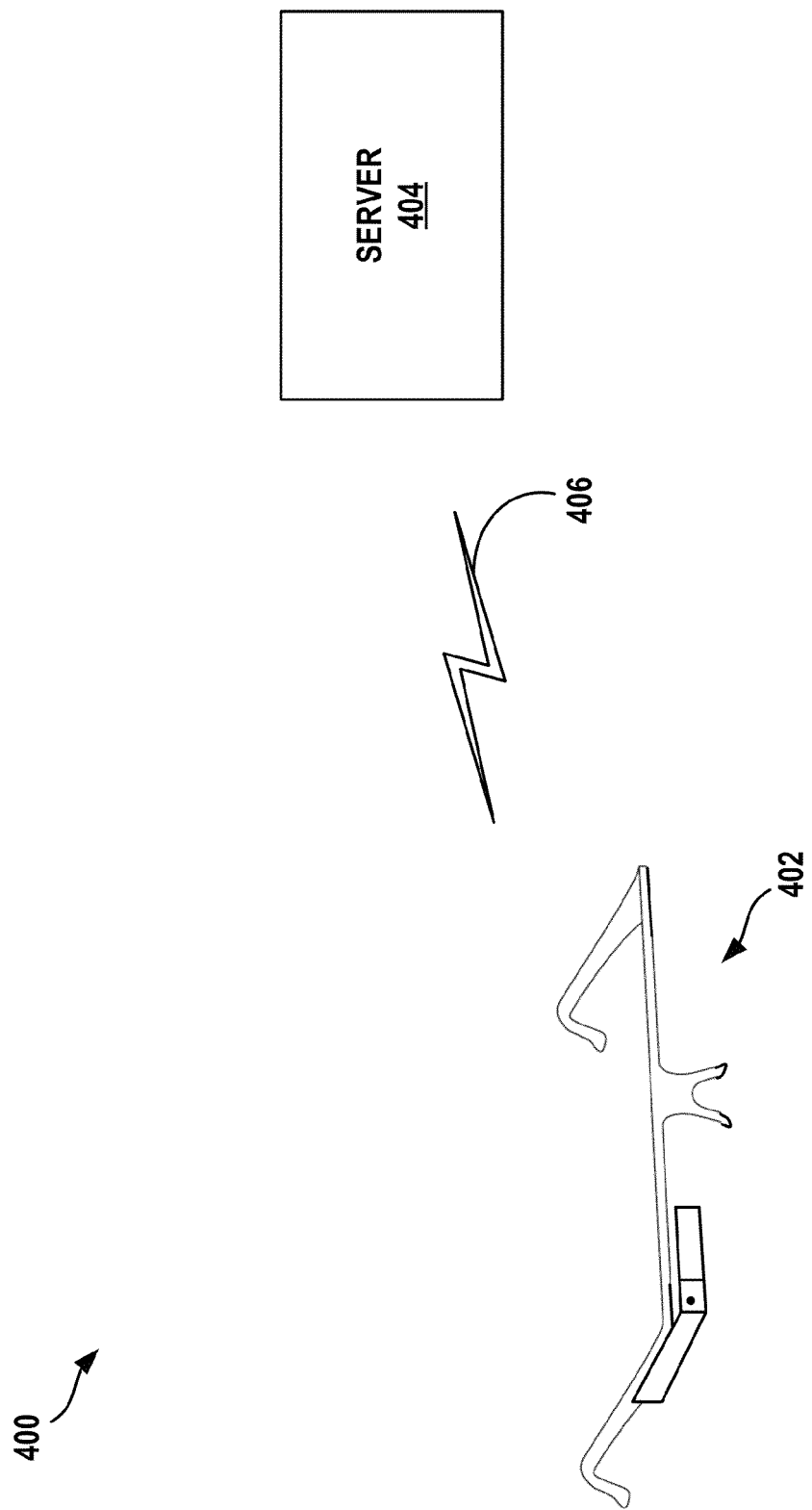

OBJECT OCCLUSION TO INITIATE A VISUAL SEARCH

CROSS-REFERENCE TO RELATED APPLICATION

This application is a non-provisional of U.S. Provisional Patent Application Ser. No. 61/583,968 filed Jan. 6, 2012, the contents of which are hereby incorporated by reference.

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a user as they go about various aspects of their everyday life. Such computing devices, which are commonly referred to as "wearable" computing devices, are configured to sense and analyze a user's environment, and to intelligently provide information appropriate to the physical world being experienced by the user.

SUMMARY

In one aspect, an example method is disclosed that includes receiving video data recorded by a camera on a wearable computing device, where the video data comprises at least a first frame and a second frame. The method further includes, based on the video data, detecting an area in the first frame that is at least partially bounded by a pointing device and, based on the video data, detecting in the second frame that the area is at least partially occluded by the pointing device. The method still further includes initiating a search on the area.

In yet another aspect, a non-transitory computer-readable medium is disclosed having stored therein instructions executable by a computing device to cause the computing device to perform the example method described above.

In still another aspect, a wearable computing device is disclosed that includes a camera configured to record video data comprising at least a first frame and a second frame. The wearable computing device further includes at least one processor and data storage comprising instructions executable by the at least one processor to detect, based on the video data, an area in the first frame that is at least partially bounded by a pointing device and, based on the video data, to detect in the second frame that the area is at least partially occluded by the pointing device. The instructions are further executable by the at least one processor to initiate a search on the area.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2A is an image of a scene as it may be perceived by a user of an example wearable computing device, in accordance with an embodiment.

FIGS. 3A-B illustrate segmenting video data into layers to select an area, in accordance with an embodiment.

FIG. 4 illustrates an example system in which the disclosed methods may be executed, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview

A wearable computing device may be configured to record video data of, for example, an environment surrounding a user. The video data may include at least a first frame and a second frame. While the wearable computing device is recording the video data, the user may wish to recognize and/or search for information pertaining to a particular object in the environment. Accordingly, the user may make a movement that defines an area in the video data in which the object is located. To this end, the user may make a movement (e.g., with a pointing device) that at least partially bounds the area in a first frame of the video data and then at least partially occludes the area in a second frame of the video data. For example, the user may "pinch" the area, by, for example, at least partially bounding the area with the user's thumb and forefinger and then bringing the thumb and forefinger together to at least partially occlude the area. Other movements are possible as well. The wearable computing device (or, in some embodiments, a server in communication with the wearable computing device) may, based on the video data, detect the area that is at least partially bounded and at least partially occluded and may initiate a search on the area.

The above method may be particularly useful in an environment that includes a number of objects. The user may specify which of the objects the user wishes to search on, and may indicate the object by at least partially bounding and then at least partially occluding an area that includes the object. In this manner, the user may more quickly receive the search results that the user desires, and computing power may not be expended to perform searches in which the user is not interested. In addition, the search results may be more accurate as a result of the user indicating the boundaries and/or other significant portions of the object to be searched.

2. Example Method

Figure 1:
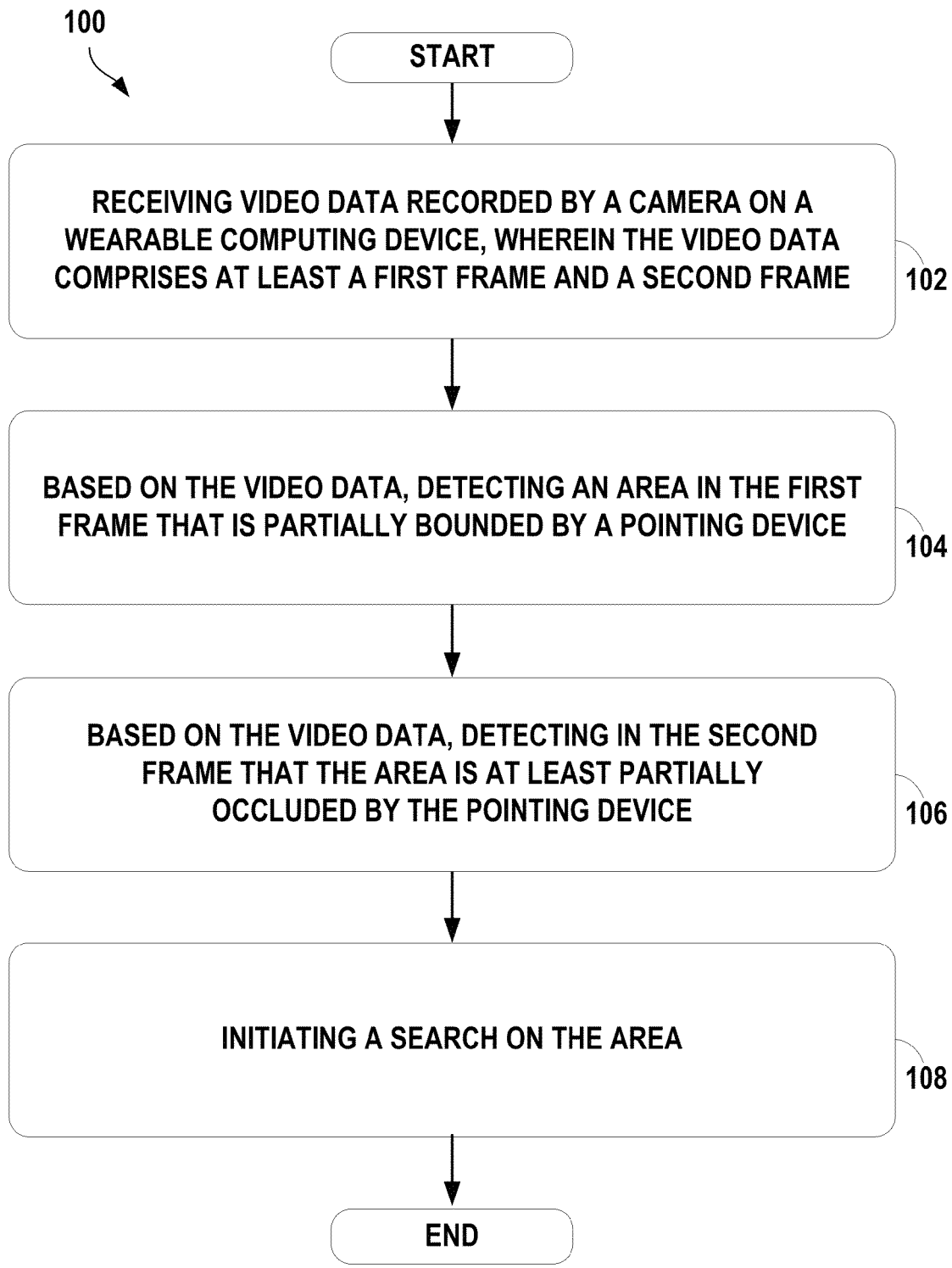
FIG. 1 is a flow chart illustrating an example method, in accordance with an embodiment.

FIG. 1 is a flow chart illustrating an example method 100, in accordance with an embodiment. Method 100 shown in FIG. 1 presents an embodiment of a method that, for example, could be used with systems, wearable computing devices, and servers described herein. Method 100 may include one or more operations, functions, or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is wired to perform the specific logical functions in the process.

Blocks 102-108 may be executed by a wearable computing device, a server, or some combination thereof. For purposes of illustration, the method 100 is described below for a wearable computing device. It is to be understood, however, that one or more of blocks 102-108 may alternatively or additionally be executed by a server. That is, in some embodiments, all of blocks 102-108 may be performed at the wearable computing device, all of blocks 102-108 may be performed at the server, or one or more of blocks 102-108 may be performed at the wearable computing device and the remaining block(s) may be performed at the server.

As shown, the method 100 begins at block 102 where a wearable computing device receives video data recorded by a camera on the wearable computing device. The video data includes at least a first frame and a second frame. The first frame and the second frame may be adjacent frames in the video data, or there may be frames between the first frame and the second frame in the video data. In general, the second frame may come after (e.g., one or more frames after) the first frame. The video data may be raw video data recorded at the camera, or may be video data that is derived from raw video data recorded at the camera. Any processing of the raw video data may be performed at the wearable computing device, at the server, and/or at a peripheral device or other entity that is communicatively coupled to the wearable computing device.

The method 100 continues at block 104 where, based on the video data, the wearable computing device detects an area in the first frame that is at least partially bounded by a pointing device. The area may be bounded on one or more sides by the pointing device. For example, in embodiments where the user at least partially bounds the area by "pinching" the area, as described above, the area may be bounded on two or three sides by the "pinch." The area may be at least partially bounded in other ways as well. The pointing device may be, for example, a body part of a user (e.g., a finger) or a non-body part controlled by a user (e.g., a glove). Other pointing devices are possible as well.

In order to detect the area that is at least partially bounded by the pointing device, wearable computing device may detect the pointing device. To this end, the wearable computing device may, for example, monitor the video data for the appearance of the pointing device. To this end, the pointing device may have a known and/or recognizable shape, texture, color, depth, and/or pattern. For instance, in embodiments where the pointing device is a finger of the user, the wearable computing device may monitor the video data for the appearance of an object or item having a color or tone that matches or resembles one or more predetermined colors and/or tones considered to be representative of a variety of skin colors. Similarly, in embodiments where the pointing device is a glove, the wearable computing device may monitor video data for the appearance of an object or item having a color, depth, pattern, or shape that matches or resembles a known color or pattern of the stylus. Alternatively or additionally, the wearable computing device may use background subtraction techniques to detect the pointing object. To this end, the wearable computing device may compare the first frame of the video data with an "average" frame in an effort to detect changes between the first frame and the average frame. The average frame may be, for example, an earlier frame in the video data, the frame immediately before the first frame, or an average (e.g., a running average, a running Gaussian average, etc.) of two or more frames before the first frame. A two-dimensional convolution may be used to align the frames before averaging in order to compensate for any small head movements of the user. Other average frames are possible as well. In order to detect changes between the first frame and the average frame, the wearable computing device may "subtract" the first frame from the average frame, such that common pixels cancel and only differing pixels remain, indicating changes between the first frame and the average frame. The changes may, for example, indicate the pointing object. It will be appreciated that the pointing device may be detected from the video data using other techniques as well, including, for example, those described in the following papers and publications: "Histogram of Oriented Gradients," Wikipedia (2012), http://en.wikipedia.org/wiki/Histogram_of_oriented_gradients; Oikonomidis et al., "Efficient Model-based 3D Tracking of Hand articulations using Kinect," The $22^{nd}$ British Machine Vision Conference (August 2011); Wang et al., "Real-Time Hand-Tracking with a Color Glove," ACM Transactions on Graphics (July 2009); Lyons et al., "GART: The Gesture and Activity Recognition Toolkit," HCI (July 2007); de la Hamette et al., "Laser Triangulation as a means of robust Visual Input for Wearable Computers," International Symposium on Wearable Computers (October 2004); Athitsos et al., "Estimating 3D Hand Pose from a Cluttered image," Proceedings of the IEEE Computer Society Conference on Computer Vision and Pattern Recognition (June 2003); Stenger et al., "Model-Based 3D Tracking of an Articulated. Hand," Proceedings of the IEEE Computer Society Conference on Computer Vision and Pattern Recognition (December 2001); Freeman et al., "Orientation Histograms for Hand Gesture Recognition," Mitsubishi Electric Research Laboratories (December 1994). It will be appreciated that the pointing device may be detected from the video data using other techniques as well.

In some embodiments, the wearable computing device may be configured with lenses on which the video data is displayed, such that the user sees representations of the area and the pointing device displayed by the wearable computing device. In these embodiments, the area that the user sees the pointing device to be at least partially bounding may be substantially similar to the area that the wearable computing device determines the pointing device to be at least partially bounding based on the video data. Thus, in these embodiments, the wearable computing device may detect the area by simply tracking the pointing device.

In other embodiments, however, the wearable computing device may be configured with substantially transparent lenses, such that the user sees the area and the pointing device in the real world. In these embodiments, the camera on the wearable computing device may not be perfectly aligned with an eye of the user, such that the area that the user sees the pointing device to be at least partially bounding may be may be shifted from the area that the wearable computing device determines the pointing device to be at least partially bounding based on the video data. In order to correct for this shift, the wearable computing device may determine a distance between the user's eye and the camera and/or an angle between the user's line of sight and the camera's alignment (e.g., based on calibration data, user input, etc.) and may use the distance and/or the angle to account for the shift. Thus, in these embodiments, the wearable computing device may detect the area by tracking the pointing device and may use the distance and/or the angle to account for the shift.

In some embodiments, in order to detect the area, the wearable computing device may segment the first frame into layers. The wearable computing device may then select at least one layer as the area. This use of segmenting is further described below in connection with FIGS. 3A-B.

The method 100 continues at block 106 where, based on the video data, the wearable computing device detects in the second frame that the area is at least partially occluded by the pointing device. For example, in embodiments where the user at least partially bounds the area by "pinching" the area, as described above, the area may be at least partially occluded by the "pinch" when the user brings his or her fingers together. The area may become at least partially occluded in other ways as well.

The wearable computing device may detect in the second frame that the area is at least partially occluded by the pointing device in a number of ways. As an example, the wearable computing device may track the pointing device and/or monitor the video data for the appearance of the pointing device in the area using any of the techniques described above. As another example, the wearable computing device may monitor the video data to detect movement (e.g., the "pinching" movement) of the pointing device by, for example, monitoring an optical-flow differential of the video data as described in, for example, co-pending U.S. patent application Ser. No. 13/105,828 to Starner. For instance, when the pointing device is moving to occlude the area, an apparent movement of the pointing device will be significantly higher than the apparent movement of the area (as the area is not itself moving). As a result, the optical-flow vectors of the pointing device will, on average, have a greater magnitude than optical-flow vectors in the area, thus creating an optical-flow differential between the pointing device and the area. Thus, by detecting the optical-flow differential, the wearable computing device may detect the movement of the pointing device into the area. As still another example, the wearable computing device may monitor the video data to detect changes of an external contour of the pointing device. For instance, the wearable computing device may detect that an external contour of the pointing device has changed from a concave contour to a convex contour (e.g., because the user's hand is concave when the thumb and finger are separated but convex when the thumb and forefinger are brought together into the "pinch"). Alternatively or additionally, the wearable computing device may detect that an external contour of the pointing device has become shorter (e.g., because the external contour shortens when the thumb and forefinger are brought together into the "pinch"). Still alternatively or additionally, the wearable computing device may detect that an inner contour exists within the pointing device (e.g., because a "hole" is formed when the thumb and forefinger are brought together into the "pinch"). It will be appreciated that the occlusion of the area may be detected from the video data in other manners as well.

In some embodiments, the wearable computing device may move between the first frame and the second frame as a result of, for example, movement of the user. As a result of the movement, the first frame and the second frame may not be aligned with one another. Accordingly, in these embodiments, the wearable computing device may detect movement of the wearable computing device using, for example, a movement sensor. The wearable computing device may then align the second frame to the first frame based on the movement. Alternatively or additionally, the wearable computing device may align the second frame to the first frame by, for example, aligning common pixels in the first and second frames or using other visual processing techniques. The wearable computing device may align the first and second frames in other manners as well.

At block 108, the wearable computing device initiates a search on the area. The search may be, for example, a visual search, such as a search of a two- or three-dimensional image or model database. The database may be stored at the wearable computing device and/or the server, or may be stored remotely and accessible to the wearable computing device and/or the server. Searching the database may involve, for example, comparing the area with some or all of the images or models in the database. The wearable computing device may then select an image or model that is most similar to the area. Similarity may be determined based on, for example, a number or configuration of visual features (e.g., colors, shapes, textures, depths, brightness levels, etc.) in the area and the object-model. For example, a Histogram of Oriented Gradients technique may be used to select the image or model, in which each image or model is described by a histogram (e.g., of intensity gradients and/or edge directions), the area is described by a histogram, and similarity is determined based on the histograms. The search may take other forms as well.

In some embodiments, the search may be initiated in response to detecting that the area has been at least partially bounded and then at least partially occluded. In other embodiments, however, the wearable computing device may additionally determine whether the movement of the pointing device was a predetermined movement. Alternatively or additionally, the wearable computing device may determine whether the area was occluded for at least a predetermined amount of time. One or both of these determinations may allow the wearable computing device to avoid initiating a search in response to, for example, a movement of the pointing device that merely happened to occlude the area and was not intended by the user to initiate a search.

Once the search is initiated, the wearable computing device may display information corresponding to results of the search. The information may be, for example, textual and/or graphical information related to the area and/or an object in the area, such as an indication of what the area includes and/or a top result of a search based on the area. Other information is possible as well.

3. Example Embodiment

FIG. 2A is an image of a scene 200 as it may be perceived by a user of an example wearable computing device, in accordance with an embodiment. The scene 200 may be a frame from video data recorded by a camera on the wearable computing device and displayed on lenses of the wearable computing device. The video data may be raw video data recorded at the camera, or may be video data that is derived from raw video data recorded at the camera. Alternatively, the scene 200 may be a real-world scene visible to the user through transparent lenses on the wearable computing device. As shown, the scene 200 includes a first object 202 and a second object 204.

Figure 2B:
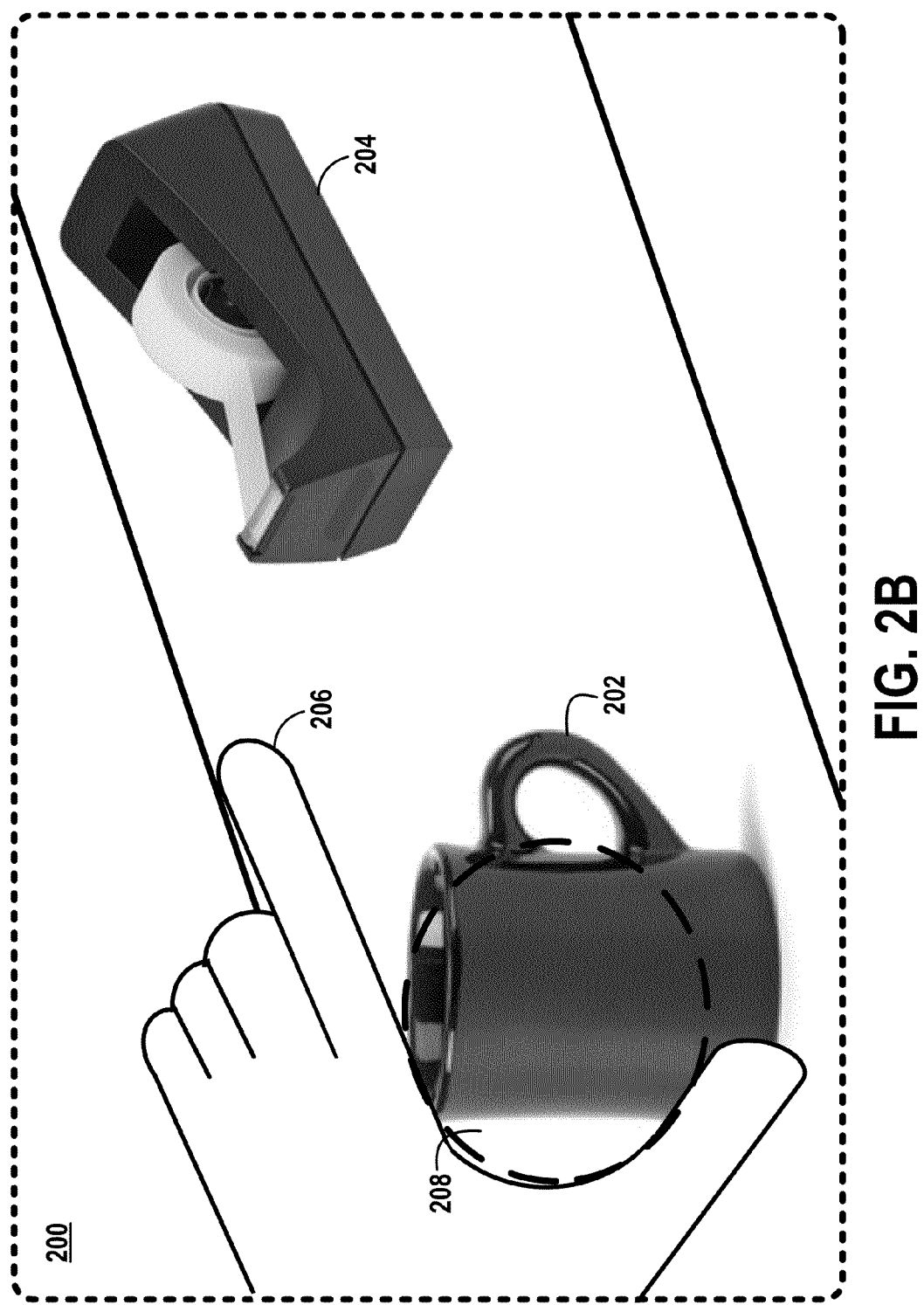
FIG. 2B is an image of a scene as it may be perceived by a user of an example wearable computing device while using a camera on the wearable computing device to record a first frame of video data in which an area is at least partially bounded by a pointing device, in accordance with an embodiment.

FIG. 2B is an image of the scene 200 as it may be perceived by the user of the example wearable computing device while using the camera on the wearable computing device to record a first frame of video data in which an area 208 is at least partially bounded by a pointing device 206, in accordance with an embodiment. As described above, the user may wish to initiate a search on an object, such as the first object 202. Accordingly, the user may "pinch" an area 208 that includes the first object 202. To this end, the user may at least partially bound the area 208 with the pointing device 206 (e.g., the user's thumb and forefinger, as shown). The wearable computing device and/or a server in communication with the wearable computing device may, based on the video data, detect the pointing device 206 and, in turn, the area 208 that is at least partially bounded by the pointing device 206.

Figure 2C:
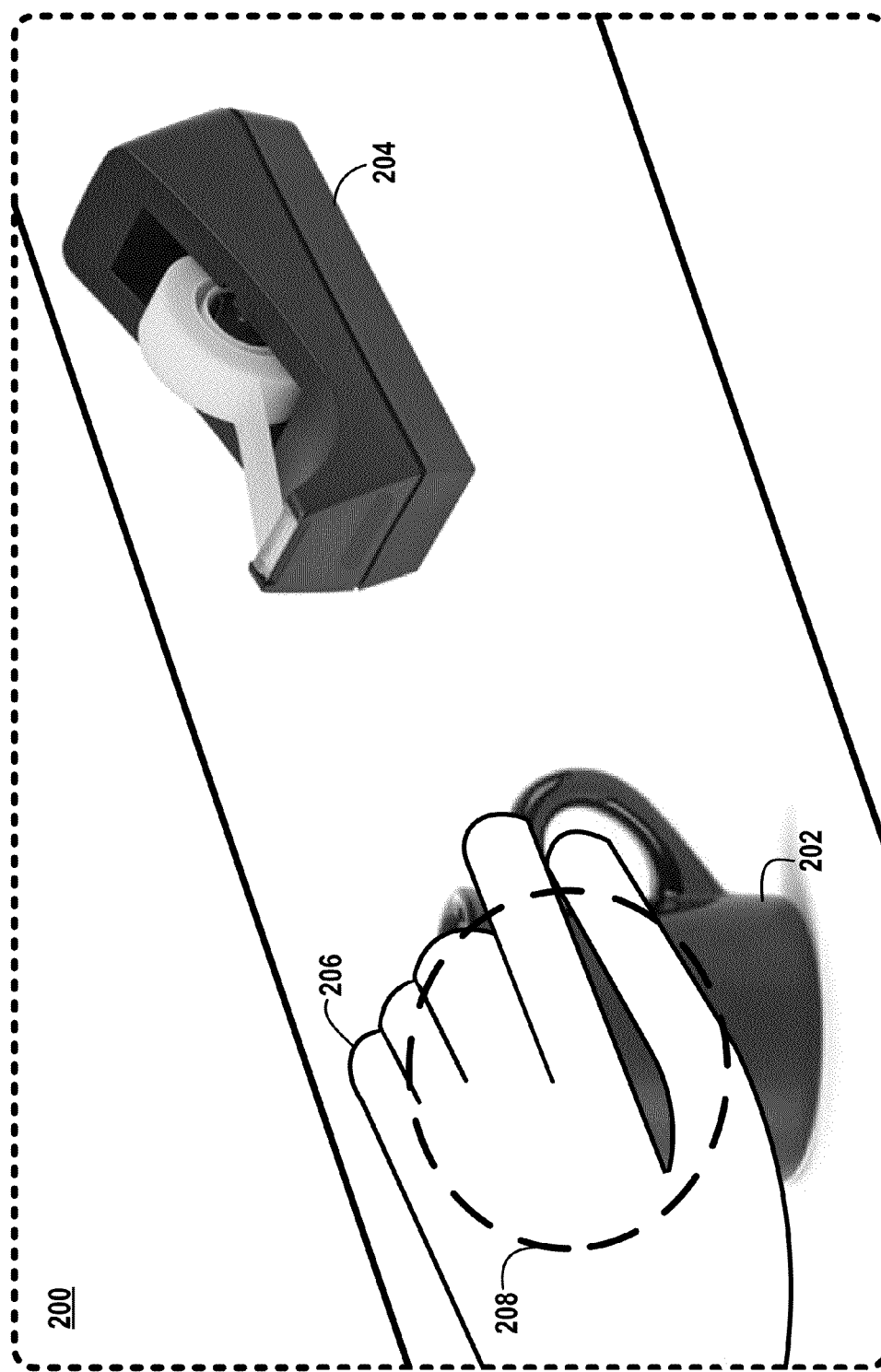
FIG. 2C is an image of a scene as it may be perceived by a user of an example wearable computing device while using a camera on the wearable computing device to record a second frame of video data in which an area is at least partially occluded by a pointing device, in accordance with an embodiment.

FIG. 2C is an image of the scene 200 as it may be perceived by the user of an example wearable computing device while using the camera on the wearable computing device to record a second frame of video data in which the area 208 is at least partially occluded by the pointing device 206, in accordance with an embodiment. As shown, the user has "pinched" the area 208, such that the area 208 is at least partially occluded by the pointing device 206 in the second frame. In response to detecting that the area 208 was at least partially bounded by the pointing device 206 in the first frame and at least partially occluded by the pointing device 206 in the second frame, the wearable computing device and/or the server may initiate a search on the area 208. Further, the wearable computing device and/or the server may display information corresponding to results of the search.

Figure 2D:
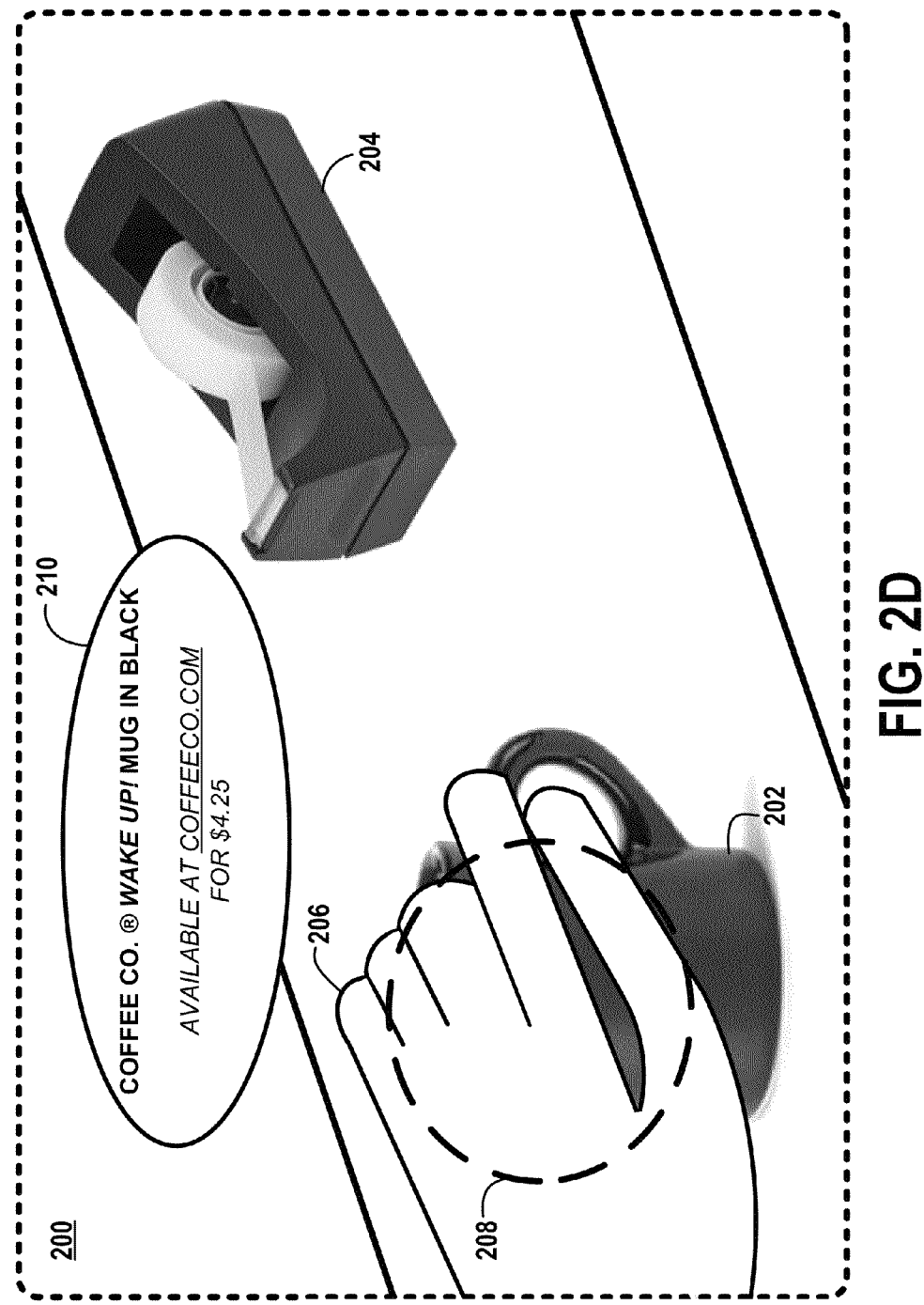
FIG. 2D is an image of a scene as it may be perceived by a user of an example wearable computing device while displaying information corresponding to results of a search, in accordance with an embodiment.

FIG. 2D is an image of the scene 200 as it may be perceived by the user of the example wearable computing device while displaying information 210 corresponding to results of the search, in accordance with an embodiment. As shown, the information 210 is overlaid on the scene 200. In other embodiments, the information 210 may be displayed in other manners as well. For example, the information 210 may scroll across the scene 200, may replace the scene 200, or may be displayed on a separate display from the scene 200. In still other embodiments, the information 210 may be presented to the user as audio information. The information 210 may take other forms as well. Further, while the information 210 is shown to include certain information, the information 210 may include any information related to the first object 202.

While the foregoing description focused on embodiments in which the user "pinches" the first object 202 to initiate the search, in other embodiments other movements of the pointing device are possible as well. For example, in some embodiments, a "waving" movement may be used, in which the pointing device at least partially bounds the area 208 and then "waves" across the area 208, thereby occluding the area 208. Any other movement that occludes the area 208 may be used as well.

4. Using Segmenting to Detect an Area

Figure 3B:
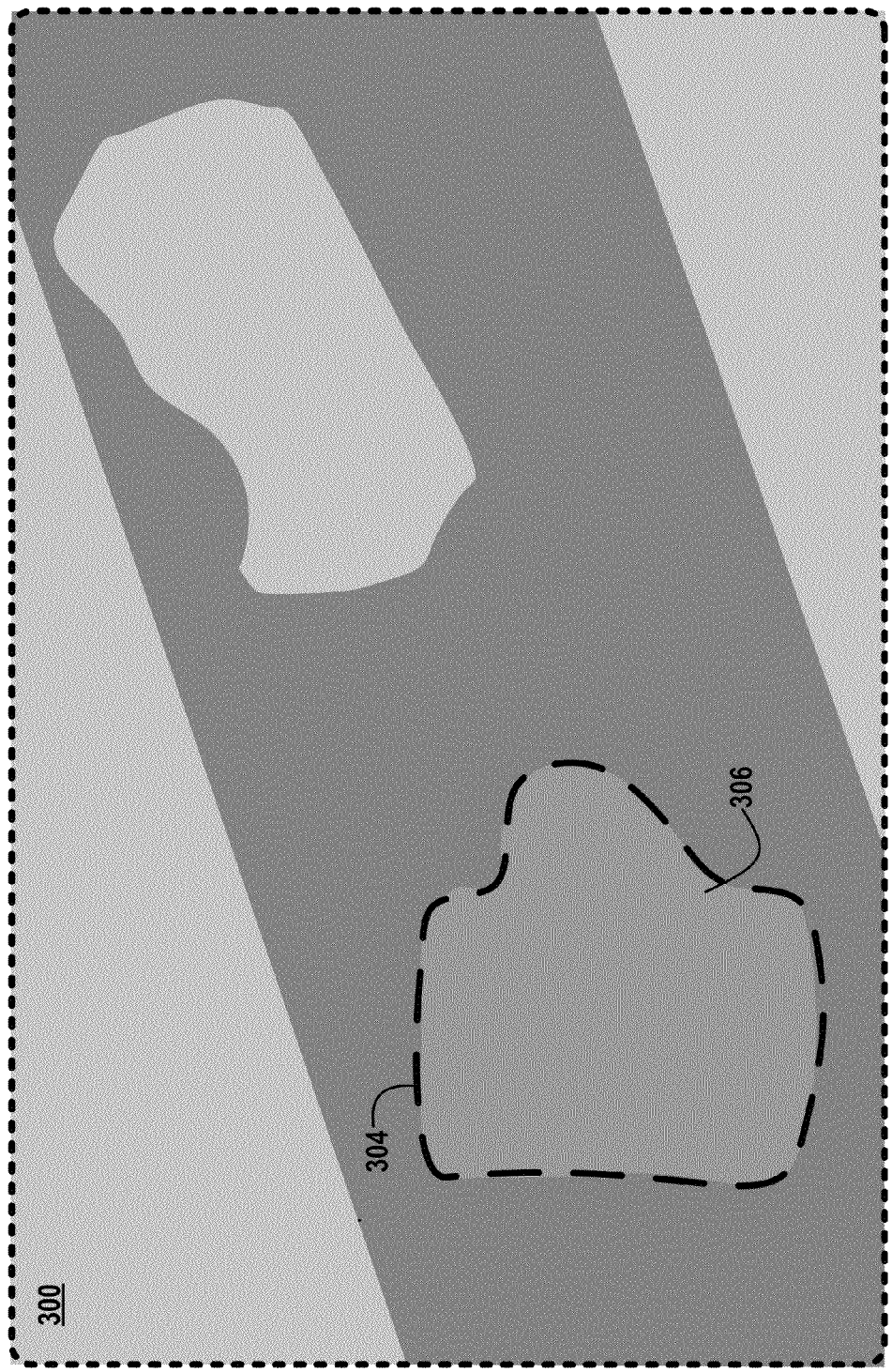

As noted above, a wearable computing device (and/or a server in communication with the wearable computing device) may detect an area that is at least partially bounded by a pointing device based on video data recorded by a camera on the wearable computing device. In some embodiments, in order to detect the area, the wearable computing device and/or the server may segment the first frame into layers. FIGS. 3A-B illustrate segmenting video data into layers to select an area, in accordance with an embodiment.

In particular, FIG. 3A illustrates a scene 300 as it may be perceived by a user of an example wearable computing device, in accordance with an embodiment. As shown, the scene 300 includes a first object 302. The wearable computing device and/or the server may detect an area 304 by, for example, detecting that a pointing device at least partially bounds the area 304, as described above. As shown in FIG. 3A, the area 304 partially includes the object 302, but does not completely include the object 302. In order to more accurately include the object 302, the wearable computing device and/or the server may segment the scene 300 into layers.

FIG. 3B illustrates the scene 300 segmented into layers. The layers are shown for purposes of illustration only; in some embodiments, the layers may not be perceived by the user. The wearable computing device and/or the server may segment the scene 300 by, for example, segmenting the scene 300 into layers that have common depth, surface orientation, color, and/or brightness. Alternatively or additionally, the wearable computing device and/or the server may segment the scene 300 into layers by detecting edges of objects in the scene 300. The wearable computing device and/or the server may detect edges of the objects by, for example, scanning the scene 300 for discontinuities, such as discontinuities in depth, surface orientation, color, and/or brightness, and may detect the edges to be along the discontinuities. The edge detection may be further refined using one or more techniques including, for example, search-based edge detection, zero-crossing-based edge detection, and Canny edge detection. Other segmenting techniques are possible as well.

As shown, a layer 306 substantially includes the object (not shown). Accordingly, the wearable computing device and/or the server may modify the area 304 to be the layer 306 (e.g., may select the layer 306 as the area 304). In some cases, the layer 306 may more accurately include the object 302. As a result, a search on the modified area 304 may provide results that more accurately pertain to the object 302.

The wearable computing device and/or the server may detect the area 304 using other techniques as well.

5. Example Architecture

Systems and devices in which example embodiments of the above example methods may be implemented will now be described in greater detail. In general, an example system may be implemented in or may take the form of a wearable computing device. However, an example system may also be implemented in or take the form of other devices, such as a mobile phone or tablet computer, among others. Further, an example system may take the form of non-transitory computer-readable medium, which has program instructions stored thereon that are executable by at least one processor to provide the functionality described herein. An example system may also take the form of a device, such as a wearable computing device, mobile phone, or tablet computer, or a subsystem of such a device that includes such a non-transitory computer-readable medium having such program instructions stored thereon.

a. Example System

FIG. 4 illustrates an example system 400 in which the disclosed methods may be executed, in accordance with an embodiment. As shown, the system 400 includes a wearable computing device 402 that is communicably coupled to a server 404 via a wireless link 406. While only one wearable computing device 402 and one server 404 is shown, more or fewer wearable computing devices and/or servers are possible as well.

As shown, the wearable computing device 402 is a pair of glasses. In other embodiments, however, other computing devices could additionally or alternatively be used. For example, the wearable computing device 402 may be an otherwise head-mounted device, such as a visor, headphones, a hat, a headband, an earpiece, or any other type of headwear that is configured to communicably couple to the server 402. Alternatively or additionally, the wearable computing device 402 could be an otherwise-wearable computing device, such as a backpack, fanny pack, belt, or any other piece of body wear that is configured to communicably couple to the server. Still alternatively or additionally, the wearable computing device 402 may be a non-wearable computing device, such as a mobile phone, a tablet computer, or any other device configured to communicably couple to server 404.

The server 404 may be, for example, a computer or plurality of computers on which one or more programs and/or applications are executed in order to provide one or more wireless and/or web-based interfaces that are accessible by the wearable computing device 402 via the wireless link 406.

The wireless link 406 may use, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Alternatively or additionally, the wireless link 406 may be a wired link, such as a wired serial bus (e.g., a universal serial bus or a parallel bus). In either case, the wireless link 406 may be a proprietary connection.

An example wearable computing device is further described below in connection with FIGS. 5A-D and 6, while an example server is further described below in connection with FIG. 7.

b. Example Wearable Computing Device

Figure 5A:
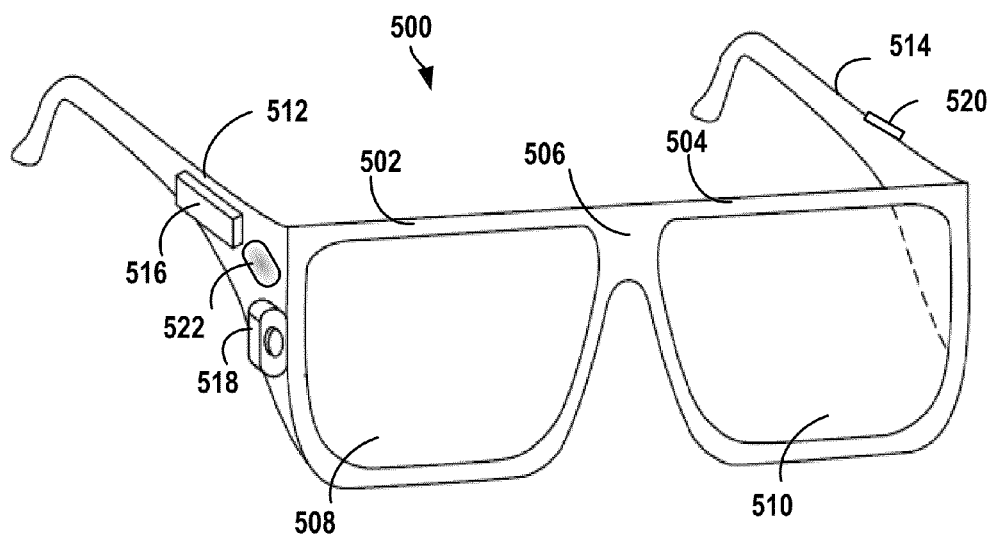
FIGS. 5A-D illustrate three-dimensional renderings of example wearable computing devices, in accordance with an embodiment.

FIGS. 5A-D illustrate three-dimensional renderings of example wearable computing devices, in accordance with an embodiment. As shown in FIG. 5A, the wearable computing system takes the form of a head-mounted device 500 (which may also be referred to as a head-mounted display). The wearable computing device may take other forms as well, including any of those described above.

As illustrated in FIG. 5A, the head-mounted device 500 comprises frame elements including lens-frames 502, 504 and a center frame support 506, lens elements 508, 510, and extending side-arms 512, 514. The center frame support 506 and the extending side-arms 512, 514 are configured to secure the head-mounted device 500 to a user's face via a user's nose and ears, respectively.

Each of the frame elements 502, 504, and 506 and the extending side-arms 512, 514 may be formed of a solid structure of plastic and/or metal, or may be formed of a hollow structure of similar material so as to allow wiring and component interconnects to be internally routed through the head-mounted device 500. Other materials may be possible as well.

One or more of each of the lens elements 508, 510 may be formed of any material that can suitably display a projected image or graphic. Each of the lens elements 508, 510 may also be sufficiently transparent to allow a user to see through the lens element. Combining these two features of the lens elements 508, 510 may facilitate an augmented reality or heads-up display where a projected image or graphic is superimposed over a real-world view as perceived by the user through the lens elements. For example, combining these two features of the lens elements 508, 510 may allow the head-mounted device 510 to overlay an object-model on an object, as described above.

The extending side-arms 512, 514 may each be projections that extend away from the lens-frames 508, 510, respectively, and may be positioned behind a user's ears to secure the head-mounted device 500 to the user. The extending side-arms 512, 514 may further secure the head-mounted device 500 to the user by extending around a rear portion of the user's head (not shown). Additionally or alternatively, for example, the head-mounted device 500 may connect to or be affixed within a head-mounted helmet structure (not shown). Other possibilities exist as well.

The head-mounted device 500 may also include an on-board computing system 516, a video camera 518, a sensor 520, and a finger-operable touch pad 522. The on-board computing system 516 is shown to be positioned on the extending side-arm 512 of the head-mounted device 500; however, the on-board computing system 516 may be provided on other parts of the head-mounted device 100 or may be positioned remote from the head-mounted device 500 (e.g., the on-board computing system 516 could be wire- or wirelessly-connected to the head-mounted device 500). The on-board computing system 516 may include a processor and memory, for example. The on-board computing system 516 may be configured to receive and analyze data from the video camera 518 and the finger-operable touch pad 522 (and possibly from other sensory devices, user interfaces, or both) and generate images for output by the lens elements 508 and 510.

The video camera 518 is shown positioned on the extending side-arm 512 of the head-mounted device 500; however, the video camera 518 may be provided on other parts of the head-mounted device 500. The video camera 518 may be configured to capture images at various resolutions or at different frame rates. A number of types of video cameras with a small form-factor, such as those used in cell phones or webcams, for example, may be incorporated into an example of the head-mounted device 500.

Further, although FIG. 5A illustrates one video camera 518, more video cameras may be used, and each may be configured to capture the same view, or to capture different views. For example, the video camera 518 may be forward facing to capture at least a portion of the real-world view perceived by the user. This forward facing image captured by the video camera 518 may then be used to generate an augmented reality in which computer generated images appear to interact with the real-world view perceived by the user.

The sensor 520 is shown on the extending side-arm 514 of the head-mounted device 500; however, the sensor 520 may be positioned on other parts of the head-mounted device 500. The sensor 520 may include one or more of a gyroscope or an accelerometer, for example. Other sensing devices may be included within, or in addition to, the sensor 520 or other sensing functions may be performed by the sensor 520.

The finger-operable touch pad 522 is shown on the extending side-arm 512 of the head-mounted device 500. However, the finger-operable touch pad 522 may be positioned on other parts of the head-mounted device 500. Also, more than one finger-operable touch pad may be present on the head-mounted device 500. The finger-operable touch pad 522 may be used by a user to input commands. The finger-operable touch pad 522 may sense at least one of a position and a movement of a finger via capacitive sensing, resistance sensing, or a surface acoustic wave process, among other possibilities. The finger-operable touch pad 522 may be capable of sensing finger movement in a direction parallel or planar to the pad surface, in a direction normal to the pad surface, or both, and may also be capable of sensing a level of pressure applied to the pad surface. The finger-operable touch pad 522 may be formed of one or more translucent or transparent insulating layers and one or more translucent or transparent conducting layers. Edges of the finger-operable touch pad 522 may be formed to have a raised, indented, or roughened surface, so as to provide tactile feedback to a user when the user's finger reaches the edge, or other area, of the finger-operable touch pad 522. If more than one finger-operable touch pad is present, each finger-operable touch pad may be operated independently, and may provide a different function.

Figure 5B:
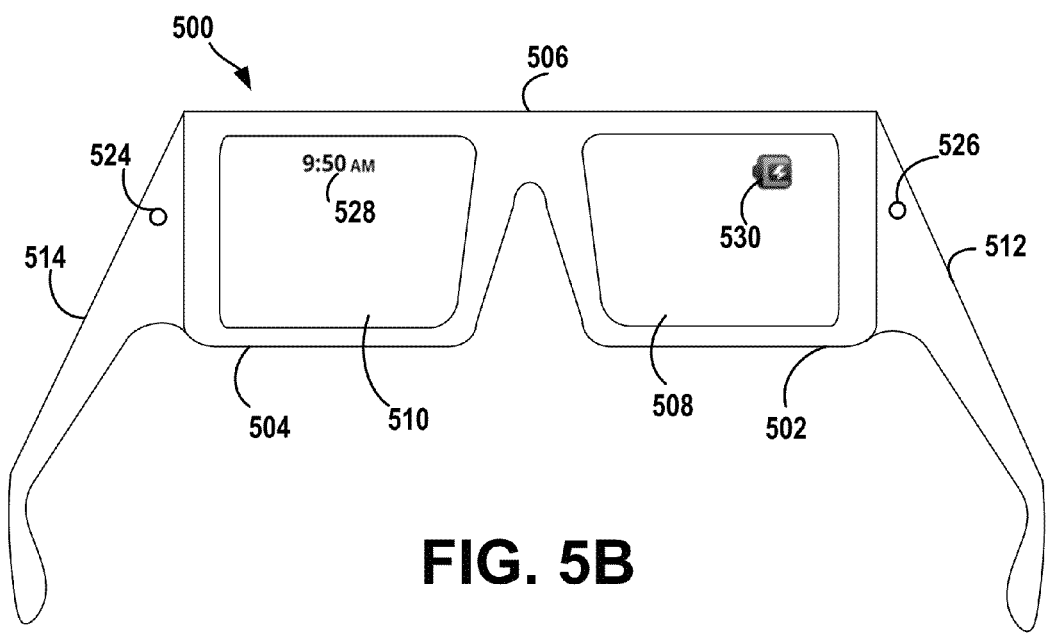

FIG. 5B illustrates an alternate view of the three-dimensional rendering of the example wearable computing device illustrated in FIG. 5A, in accordance with an embodiment. As shown in FIG. 5B, the lens elements 508, 510 may act as display elements. The head-mounted device 500 may include a first projector 524 coupled to an inside surface of the extending side-arm 514 and configured to project a display 528 onto an inside surface of the lens element 510. Additionally or alternatively, a second projector 526 may be coupled to an inside surface of the extending side-arm 512 and configured to project a display 530 onto an inside surface of the lens element 508.

The lens elements 508, 510 may act as a combiner in a light projection system and may include a coating that reflects the light projected onto them from the projectors 524, 526. In some embodiments, a reflective coating may not be used (e.g., when the projectors 524, 526 are scanning laser devices).

In alternative embodiments, other types of display elements may also be used. For example, the lens elements 508, 510 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 508, 510 for driving such a matrix display. Alternatively or additionally, a laser or LED source and scanning system could be used to draw a raster display directly onto the retina of one or more of the user's eyes. Other possibilities exist as well.

Figure 5C:
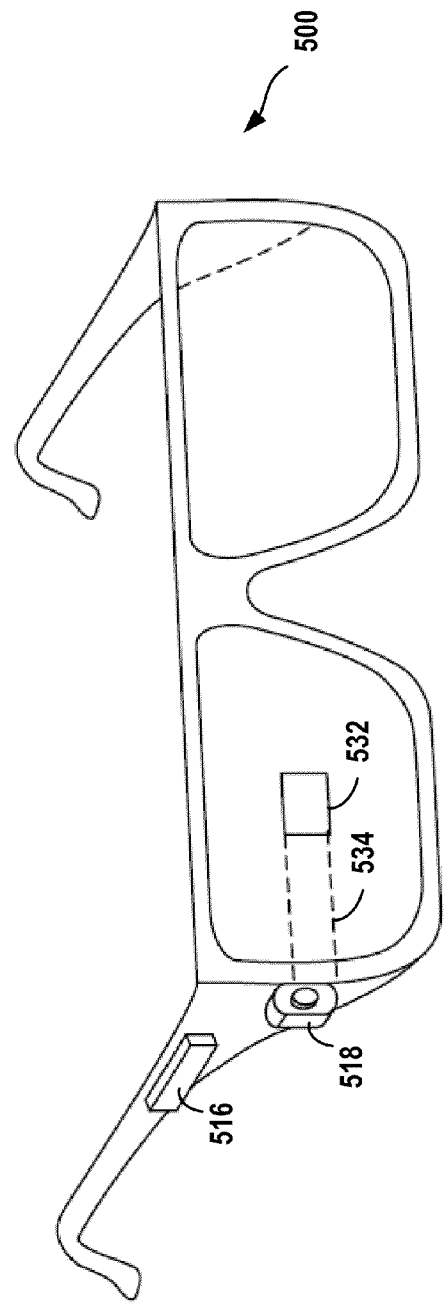

FIG. 5C illustrates a three-dimensional rendering of another wearable computing system, in accordance with an embodiment. As shown in FIG. 5C, the wearable computing device takes the form of a head-mounted device 500. The head-mounted device 500 may include frame elements and side-arms similar to those described above in connection with FIGS. 5A-B. The head-mounted device 500 may additionally include an on-board computing system 516 and a video camera 518, which may take any of the forms described above in connection with FIGS. 5A-B. The video camera 518 is shown mounted on a frame of the head-mounted device 500. However, the video camera 518 may be mounted at other positions as well.

As shown in FIG. 5C, the head-mounted device 500 may include a single display 532 which may be coupled to the head-mounted device 500. The display 532 may be formed on one of the lens elements of the head-mounted device 500 and may be configured to overlay computer-generated graphics in the user's view of the physical world. For example, the display 532 may be configured to overlay an object-model on an object in the physical world, as described above. The display 532 is shown to be provided in a center of a lens of the head-mounted device 500; however, the display 532 may be provided in other positions as well. The display 532 is controllable via the computing system 516, which may be coupled to the display 532 via an optical waveguide 534, as shown.

Figure 5D:
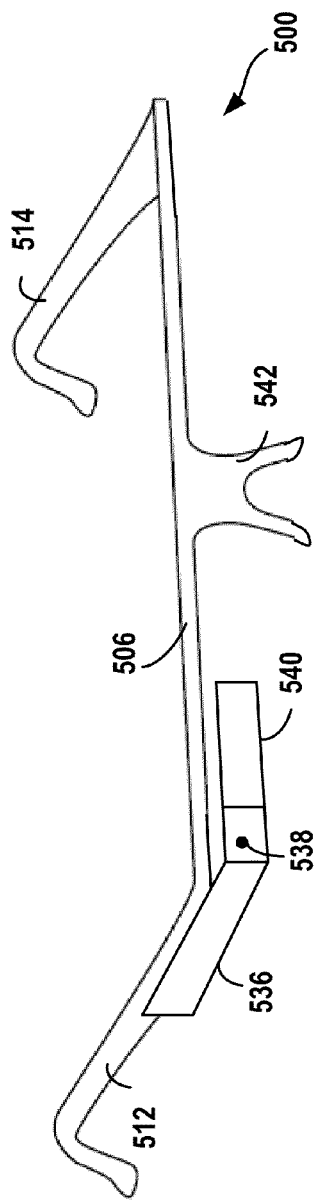

FIG. 5D illustrates a three-dimensional rendering of another wearable computing system, in accordance with an embodiment. As shown in FIG. 5D, the wearable computing device takes the form of a head-mounted device 500. The head-mounted device 500 may include side-arms 512, 514 and a center frame support 506, which take any of the forms described above in connection with FIGS. 5A-B. Further, the head-mounted device 500 may include a bridge portion with nosepiece 542. The head-mounted device 500 may additionally include an on-board computing system and a video camera (not shown), which may take any of the forms described above in connection with FIGS. 5A-B.

As shown in FIG. 5D, the center frame support 506 connects the side-arms 512, 514. In contrast to those shown in FIGS. 5A-C, the head-mounted device 500 shown in FIG. 5D does not include lens-frames containing lens elements. Rather, as shown, the head-mounted device 500 may include a single lens element 540 that may be coupled to one of the side-arms 512 and/or the center frame support 506. The single lens element 540 may include a display and may be configured to overlay computer-generated graphics upon the user's view of the physical world. For example, the display 532 may be configured to overlay an object-model on an object in the physical world, as described above. The display may be controllable via the computing system, which may be coupled to the display via an optical waveguide 538, as shown.

In one example, the single lens element 540 may be coupled to the inner side (i.e., the side exposed to a portion of a user's head when worn by the user) of the extending side-arm 512. The single lens element 540 may be positioned in front of or proximate to a user's eye when the head-mounted device 500 is worn by a user. For example, the single lens element 540 may be positioned below the center frame support 506, as shown in FIG. 5D.

Figure 6:
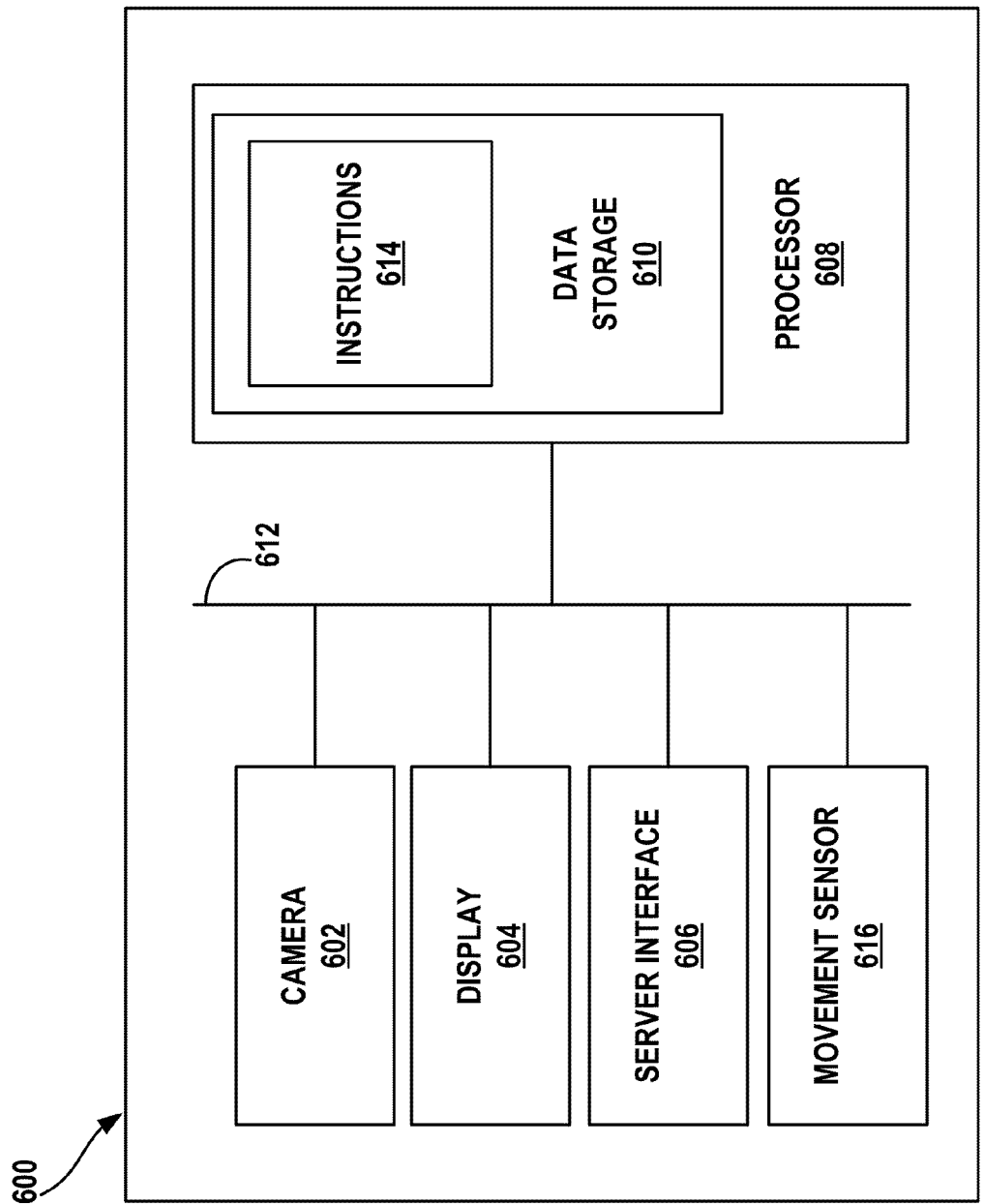
FIG. 6 is a simplified block diagram of an example wearable computing device, in accordance with an embodiment.

FIG. 6 is a simplified block diagram of an example wearable computing device 600, in accordance with an embodiment. As shown, the wearable computing device 600 includes a camera 602, a display 604, a server interface 606, a processor 608, and data storage 610, all of which may be communicatively linked together by a system bus, network, and/or other connection mechanism 612.

The camera 602 may be any camera configured to record video data including a first frame and a second frame. To this end, the camera 602 may be configured to detect visible light, or may be configured to detect light from other portions of the spectrum, such as infrared or ultraviolet light, or x-rays. Other types of cameras are possible as well. The camera 602 may be a two-dimensional detector, or may have a three-dimensional spatial range. In some embodiments, the camera 602 may be, for example, a range detector configured to generate a two-dimensional image showing a distance from the camera 602 to a number of points in the video data. To this end, the camera 602 may use one or more range detecting techniques. For example, the camera 602 may use a structured light technique in which the wearable computing device 600 illuminates an object with a predetermined light pattern, such as a grid or checkerboard pattern and uses the camera 602 to detect a reflection of the predetermined light pattern off the object. Based on distortions in the reflected light pattern, the wearable computing device 600 may determine the distance to the points on the object. The predetermined light pattern may comprise infrared light, or light of another wavelength. As another example, the camera 602 may use a laser scanning technique in which the wearable computing device 600 emits a laser and scans across a number of points the object. While scanning the object, the wearable computing device 600 uses the camera 602 to detect a reflection of the laser off the object for each point. Based on a length of time it takes the laser to reflect off the object at each point, the wearable computing device 600 may determine the distance to the points on the object. As yet another example, the camera 602 may use a time-of-flight technique in which the wearable computing device 600 emits a light pulse and uses the camera 602 to detect a reflection of the light pulse off an object at a number of points on the object. In particular, the camera 602 may include a number of pixels, and each pixel may detect the reflection of the light pulse from a point on the object. Based on a length of time it takes the light pulse to reflect off the object at each point, the wearable computing device 600 may determine the distance to the points on the object. The light pulse may be a laser pulse. Other range detecting techniques are possible as well, including stereo triangulation, sheet-of-light triangulation, interferometry, and coded aperture techniques, among others. In some embodiments, the camera 602 may be enhanced through sensor fusion technology. The camera 602 may further take any of the forms described above in connection with FIG. 5A.

The display 604 may be any display configured to display information corresponding to results of a search, as described above. In some embodiments, the display may additionally be configured to display the video data recorded by the camera 602. To this end, the display 604 may be configured to display information received from the processor 608. The display 604 may additionally be configured to display information received from one or more additional sources. The display 604 may be, for example, a heads-up display, a head-mounted display, an optical see-through display, an optical see-around display, a video see-through display, a flat-panel display, a light-emitting diode (LED) display, an electroluminescent display (ELD), a liquid crystal display (LCD), an organic LED (OLED) display, or any other type of display now known or later developed. The display 604 may alternatively or additionally take any of the forms described above in connection with FIGS. 5A-D.

The server interface 606 may be any interface configured to wirelessly communicate with a server. In particular, the server interface 606 may be configured to transmit to the server one or more of the video data (or data derived from the video data) recorded by the camera 602 and a request to initiate a search. Further, the server interface 606 may be configured to transmit to the server data indicating movement of the wearable computing device 600 as sensed by the movement sensor 616. Further, the server interface 606 may be configured to receive from the server the video data segmented into layers and/or information corresponding to results of the search.

To this end, the server interface 606 may include an antenna and a chipset for communicating with the server over an air interface. The chipset or server interface 606 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the server interface 606 may also be configured to wirelessly communicate with one or more other devices, such as a database and/or other wearable computing devices.

The processor 608 may comprise one or more general-purpose processors and/or one or more special-purpose processors. To the extent the processor 608 includes more than one processor, such processors could work separately or in combination. Further, the processor 608 may be integrated in whole or in part with the server interface 604 and/or with other components.

Data storage 610, in turn, may comprise one or more volatile and/or one or more non-volatile storage components, such as optical, magnetic, and/or organic storage, and data storage 610 may be integrated in whole or in part with the processor 608. In some embodiments, data storage 610 may contain instructions 614 (e.g., program logic) executable by the processor 608 to execute various wearable computing device functions. For example, data storage 610 may contain instructions 614 executable by the processor 608 to cause the camera 602 to record the video data including the first frame and the second frame. The instructions 614 may be further executable by the processor 608 to detect, based on the video data, an area in the first frame that is at least partially bounded by a pointing device and, based on the video data, detect in the second frame that the area is at least partially occluded by the pointing device. This detection may involve the wearable computing device 600 analyzing the video data itself, or may involve the wearable computing device 600 causing the server interface 606 to transmit the video data (or data derived from the video data) to the server and, in response, receiving from the server one or both of the video data segmented into layers and an indication of the area. The instructions 614 may be still further executable by the processor 608 to initiate a search on the area. This initiation may involve the wearable computing device 600 searching a database itself, or may involve the wearable computing device 600 causing the server interface 606 to transmit to the server a request for the server to search the database. The request may include the video data (or data derived from the video data) recorded by the camera 602. Data storage 610 may contain additional instructions 614 as well.

The wearable computing device 600 may include one or more elements in addition to or instead of those shown. For example, the wearable computing device 600 may include a movement sensor 616, which may be any sensor configured to sense movement of the wearable computing device 600. To this end, the movement sensor 616 may include one or more of a gyroscope or an accelerometer, for example. Other movement sensors 616 are possible as well. In embodiments where the wearable computing device 600 includes the movement sensor 616, the instructions 614 may be further executable by the processor 608 to align the first frame and the second frame based on the movement sensed by the movement sensor 616. In other embodiments, the wearable computing device 600 may not include the movement sensor 616, and instead the instructions 614 may be further executable by the processor 608 to align the first and second frames using one or more visual processing techniques.

The wearable computing device 600 may include other elements as well. For example, the wearable computing device 600 may include one or more additional interfaces and/or one or more power supplies. Other additional components are possible as well. In these embodiments, data storage 610 may further include instructions executable by the processor(s) to control and/or communicate with the additional components.

c. Example Server

Figure 7:
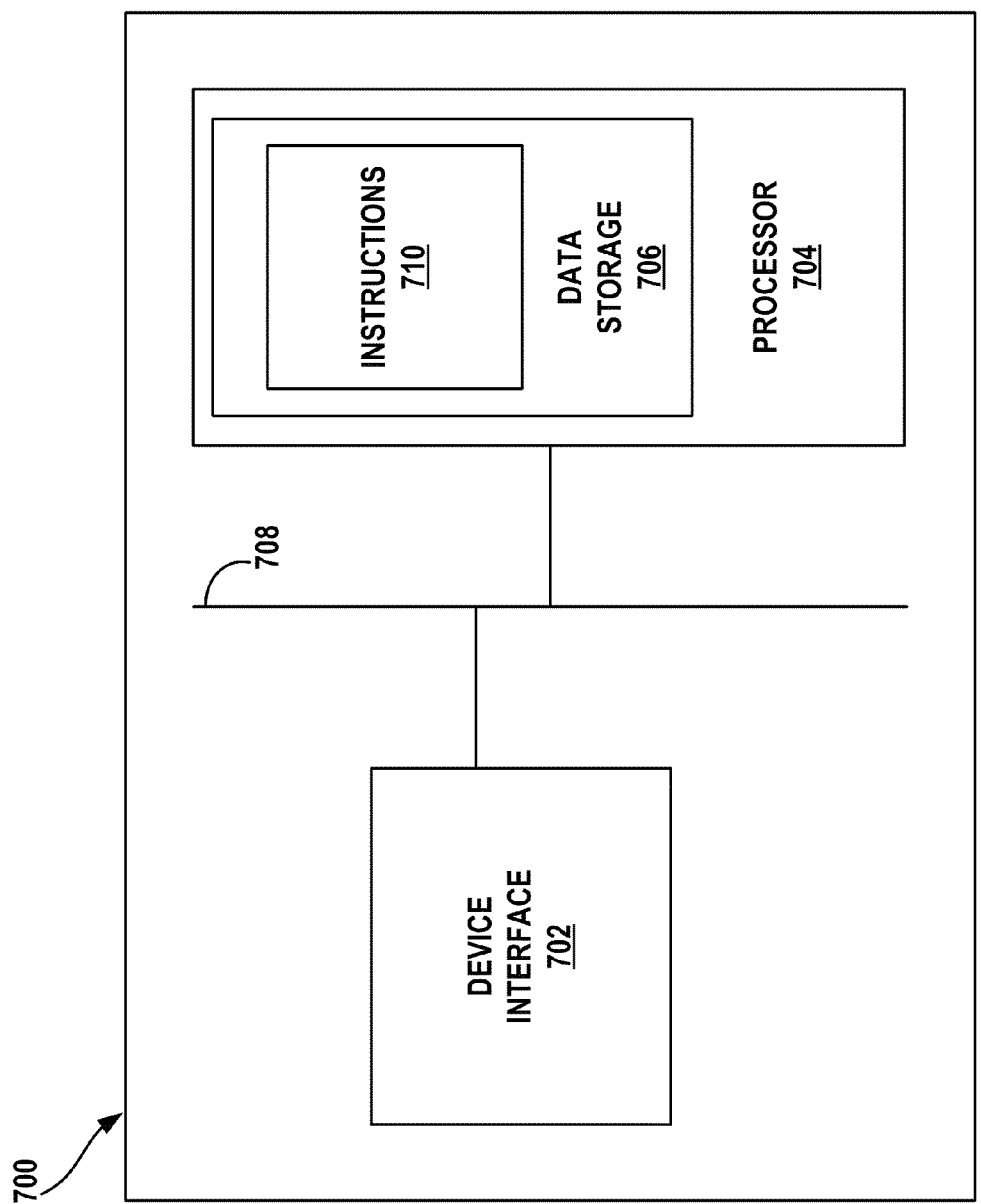
FIG. 7 is a simplified block diagram of an example server, in accordance with an embodiment.

FIG. 7 shows a block diagram of an example server 700, in accordance with an embodiment. As shown, the server 700 includes a device interface 702, a processor 704, and data storage 706, all of which may be communicatively linked together by a system bus, network, and/or other connection mechanism 708.

The device interface 702 may be any interface configured to wirelessly communicate with a wearable computing device. In particular, the device interface 702 may be configured to receive from the wearable computing device one or more of video data (or data derived from video data) including a first frame and a second frame recorded by a camera at the wearable computing device, a request to initiate search, and data indicating movement of the wearable computing device. Further, the device interface 702 may be configured to transmit to the wearable computing device information corresponding to results of the search and, in some embodiments, the video data segmented into layers.

To this end, the device interface 702 may include an antenna and a chipset for communicating with the wearable computing device over an air interface. The chipset or device interface 702 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the device interface 702 may also be configured to wirelessly communicate with one or more other devices, such as a database and/or other wearable computing devices.

The processor 704 may comprise one or more general-purpose processors and/or one or more special-purpose processors. To the extent the processor 704 includes more than one processor, such processors could work separately or in combination. Further, the processor 704 may be integrated in whole or in part with the device interface 702 and/or with other components.

Data storage 706, in turn, may comprise one or more volatile and/or one or more non-volatile storage components, such as optical, magnetic, and/or organic storage, and data storage 706 may be integrated in whole or in part with the processor 706. As shown, data storage 706 may contain instructions 712 (e.g., program logic) executable by the processor 706 to execute various server functions. For example, data storage 706 may include instructions 712 executable by the processor 706 to detect, based on the video data received from the wearable computing device via the device interface 702, an area in the first frame that is at least partially bounded by a pointing device and, based on the video data, detect in the second frame that the area is at least partially occluded by the pointing device. In some embodiments, this detection may involve the server 700 segmenting the video data into layers and selecting a layer as the area. The instructions 712 may be further executable by the processor 706 to initiate a search on the area. Data storage 706 may include additional program logic as well.

The server 700 may include one or more elements in addition to or instead of those shown. For example, the server 700 may include one or more additional interfaces and/or one or more power supplies. As another example, the server 700 may include database in which the search takes place. The database may take any of the forms described above. Other additional components are possible as well. In these embodiments, data storage 706 may further include instructions executable by the processor(s) to control and/or communicate with the additional components.

6. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
receiving video data recorded by an outward-facing camera on a wearable computing device, wherein the video data comprises at least a first frame and a second frame, wherein the video data captures a real-world environment of the wearable computing device, and wherein an object from the real-world environment is captured in the first frame;
detecting an object from the real-world environment in the first frame;
detecting a pinch gesture that corresponds to the object from the real-world environment, wherein detecting the pinch gesture comprises:
detecting an area in the first frame that is at least partially bounded by a pointing device;
determining that the at least partially-bounded area of the first frame includes at least a portion of the object;
within a predetermined period of time from detecting the area in the first frame that is at least partially bounded by the pointing device, detecting an area in the second frame that is at least partially occluded by the pointing device; and
determining that the at least partially-occluded area of the second frame includes at least a portion of the object; and
in response to detecting the pinch gesture that corresponds to the object from the real-world environment, initiating a search on the object from the real-world environment.

2. The method of claim 1, wherein the pointing device comprises at least two fingers.

3. The method of claim 1, wherein initiating the search on the object comprises initiating a visual search on image content comprising the object.

4. The method of claim 1, further comprising causing the wearable computing device to display information corresponding to results of the search.

5. The method of claim 1, further comprising:
- between recording the first frame and the second frame, detecting movement of the wearable computing device; and
- aligning the second frame to the first frame based on the movement;
- wherein determining that the at least partially-occluded area of the second frame includes at least a portion of the object comprises determining that the at least partially-occluded area of the second frame is in a substantially same area of the frame as the at least partially bounded area in the first frame.

6. The method of claim 1, wherein:
- the camera is configured to be offset from an eye of a user by an angle and a distance; and
- detecting the area in the first frame is based on the angle and the distance.

7. The method of claim 1, wherein detecting the area in the first frame comprises:
- segmenting the first frame into layers; and
- selecting at least one layer as the area.

8. A wearable computing device comprising:
- an outward-facing camera configured to record video data comprising at least a first frame and a second frame, wherein the video data captures a real-world environment of the wearable computing device, and wherein an object from the real-world environment is captured in the first frame;
- at least one processor; and
- data storage comprising instructions executable by the at least one processor to:
  - detect an object from the real-world environment in the first frame;
  - detect a pinch gesture that corresponds to the object from the real-world environment, wherein detection of the pinch gesture comprises both:
    - detection of an area in the first frame that is at least partially bounded by a pointing device;
    - a determination that the at least partially-bounded area of the first frame includes at least a portion of the object;
    - within a predetermined period of time from detection of the area in the first frame that is at least partially bounded by the pointing device, detection of an area in the second frame that is at least partially occluded by the pointing device; and
    - a determination that the at least partially-occluded area of the second frame includes at least a portion of the object; and
  - in response to detection of the pinch gesture that corresponds to the object from the real-world environment, initiate a search on the object from the real-world environment.

9. The wearable computing device of claim 8, further comprising a display configured to display information corresponding to results of the search.

10. The wearable computing device of claim 9, wherein the display comprises a head-mounted display.

11. The wearable computing device of claim 9, wherein the display is further configured to display the first frame and the second frame.

12. The wearable computing device of claim 8, wherein the pointing device comprises at least two fingers.

13. The wearable computing device of claim 8, wherein the search comprises a visual search.

14. The wearable computing device of claim 8, further comprising a movement sensor configured to sense movement of the wearable computing device.

15. The wearable computing device of claim 14, wherein the instructions are further executable by the at least one processor to align the second frame to the first frame based on the movement.

16. The wearable computing device of claim 8, wherein:
- the camera is configured to be offset from an eye of a user by an angle and a distance; and
- detecting the area in the first frame is based on the angle and the distance.

17. The wearable computing device of claim 8, wherein detecting the area in the first frame comprises:
- segmenting the first frame into layers; and
- selecting as the area at least one layer.

18. A non-transitory computer-readable medium having stored therein instructions executable by a computing device to cause the computing device to perform functions comprising:
- using an outward-facing camera on a wearable computing device to record a video comprising at least a first frame and a second frame, wherein the video data captures a real-world environment of the wearable computing device, and wherein an object from the real-world environment is captured in the first frame;
- detecting an object from the real-world environment in the first frame;
- detecting a pinch gesture that corresponds to the object from the real-world environment, wherein detecting the pinch gesture comprises both:
  - detecting an area in the first frame that is at least partially bounded by a pointing device;
  - determining that the at least partially-bounded area of the first frame includes at least a portion of the object;
  - within a predetermined period of time from detecting the area in the first frame that is at least partially bounded by the pointing device, detecting an area in the second frame that is at least partially occluded by the pointing device; and
  - determining that the at least partially-occluded area of the second frame includes at least a portion of the object; and
- in response to detecting the pinch gesture that corresponds to the object from the real-world environment, initiating a search on the object from the real-world environment.

19. The non-transitory computer-readable medium of claim 18, wherein the pointing device comprises at least two fingers.

20. The non-transitory computer-readable medium of claim 18, wherein the search comprises a visual search.

21. The method of claim 1, further comprising:
- aligning the second frame to the first frame based on the movement;
- wherein determining that the at least partially-occluded area of the second frame includes at least a portion of the object comprises determining that the at least partially-occluded area of the second frame is in a substantially same area of the frame as the at least partially bounded area in the first frame.

* * * * *